(12) United States Patent
Shu

(10) Patent No.: US 9,384,449 B2
(45) Date of Patent: Jul. 5, 2016

(54) PARALLEL HARDWARE SEARCHING SYSTEM FOR BUILDING ARTIFICIAL INTELLIGENT COMPUTER

(71) Applicant: Koutin Technology Inc. LTD, New Taipei (TW)

(72) Inventor: Wen-Lung Shu, New Taipei (TW)

(73) Assignee: KOUTIN TECHNOLOGY INC. LTD, New Taipei (TW)

( * ) Notice: Subject to any disclaimer, the term of this patent is extended or adjusted under 35 U.S.C. 154(b) by 192 days.

(21) Appl. No.: 14/160,622

(22) Filed: Jan. 22, 2014

(65) Prior Publication Data

US 2015/0100536 A1    Apr. 9, 2015

(30) Foreign Application Priority Data

Oct. 4, 2013   (TW) .............................. 102136037 A

(51) Int. Cl.
   *G06N 99/00*    (2010.01)
   *G06F 12/00*    (2006.01)
   *G06F 17/30*    (2006.01)

(52) U.S. Cl.
   CPC .............. *G06N 99/005* (2013.01); *G06F 12/00* (2013.01); *G06F 17/30* (2013.01)

(58) Field of Classification Search
   None
   See application file for complete search history.

(56) References Cited

U.S. PATENT DOCUMENTS

2007/0214117 A1*   9/2007   Shu ................... G06F 17/30445

OTHER PUBLICATIONS

Yang, Yi-Hua Edward, and Viktor K. Prasanna. "High throughput and large capacity pipelined dynamic search tree on FPGA." Proceedings of the 18th annual ACM/SIGDA international symposium on Field programmable gate arrays. ACM, 2010.*
Fong, Jeffrey, et al. "ParaSplit: a scalable architecture on FPGA for terabit packet classification." High-Performance Interconnects (HOTI), 2012 IEEE 20th Annual Symposium on. IEEE, 2012.*
Shu, Wenlung, and Junming Lan. "Design a pathway/genome expert system using a prolog machine incorporated with a parallel hardware searcher." APAMI 2006 (2006): 236.*

* cited by examiner

*Primary Examiner* — Stanley K Hill
*Assistant Examiner* — David H Kim
(74) *Attorney, Agent, or Firm* — WPAT, PC; Justin King

(57) ABSTRACT

An affordable artificial intelligent (AI) computer is invented by combining present computer with a parallel hardware search system. Such a computer can be treated as a Turing Machine. Instead of sequentially processing computer instructions, this computer executes AI logic reasoning. The parallel hardware search system use pure parallel hardware to execute virtual B-tree search. Hierarchical page table and hash techniques are also used for very large data volume. The prototype of this invented system is successfully built into a PCIE card which mainly contains a Xilinx's Kintex7 FPGA chip and two DDR3 memory modules. FPGA chip includes: 32 32-bit processing units (PUs), one PCIE controller, one search/delete/insert controller and two DDR3 controllers.

8 Claims, 5 Drawing Sheets

| PU$_{32}$ | 32 | 64 | 96 | ... | 928 | 960 |

| PU$_{31}$ | 31 | 63 | 95 | ... | 927 | 959 |

⋮

| PU$_3$ | 3 | 35 | 67 | ... | 899 | 931 |

| PU$_2$ | 2 | 34 | 66 | ... | 898 | 930 |

| PU$_1$ | 1 | 33 | 65 | ... | 897 | 929 | 961 |

FIG. 3

PARALLEL HARDWARE SEARCHING SYSTEM FOR BUILDING ARTIFICIAL INTELLIGENT COMPUTER

FIELD OF THE INVENTION

The present invention relates to a parallel hardware searching system, and more particularly, to a parallel hardware searching system that can be used to build up an affordable artificial intelligent computer, the system uses pure parallel hardware to execute virtual B-tree search, hierarchical page table and hash techniques to manage very large data volume in a very efficient way.

BACKGROUND OF THE INVENTION

In Chomsky hierarchy, present computer language grammar is defined as context-free, and Turing machine is defined as the grammar with highest level. Present computer usually processes sequential instructions. In order to execute logic reasoning in artificial intelligent field, PROLOG language needs to search and process horn clauses (rules or facts) in each step. Therefore, search became the largest bottleneck of this language. Since PROLOG possesses the completeness of Turing machine, the computer system that efficiently processes PROLOG is considered to be a Turing machine, or called it "an artificial intelligent computer".

In 1980's, Japanese government lunched a fifth generation computer project. PROLOG is utilized as major language in this project. In 2011, IBM's supercomputer called "WATSON" had been proved to be more intelligent than human being. Cloud computing technique is used to solve PROLOG problem. WATSON contains nearly 3000 servers in the web. Apple Computer Company's Siri system further applies this technique to people's common life. Such huge and expensive computer system can only be owned by big international enterprise. Robotic technique has good progress in recent years. However, building an affordable intelligent computer system to promote robotic industry still remains a challenging task.

SUMMARY OF THE INVENTION

The prototype of this invented system is successfully built into a PCI card which mainly contains a Xilinx's Kintex7 FPGA chip and two DDR3 memory modules. In order to efficiently implement large data volume, hierarchical paging table and hash techniques are applied in our searching system in this invention. Since our method can use pure hardware to implement search operation by eliminating B-tree structure, four mathematical equations are used to simulate virtual B-tree. Each equation can be executed in one clock cycle in our design.

A large number of ordered records are partitioned into many paging tables. These tables are constructed into hierarchical structure with 3 levels in FIG. 1. In the invented search prototype, 6 comparisons are required to search $0.8875 \times 10^9$ records in worst case, and average comparison number is 2. In our present computer, 6 comparisons can only search 63 records. The main purpose of this invention is solving PROLOG problem. Hence present computer's main language grammar can be upgraded from context-free to Turing Machine. This prototype system uses 32 32-bit processing units. For any processing unit number, it can be mathematically proved that the invented system is a real parallel system.

BRIEF DESCRIPTION OF THE DRAWINGS

FIG. 3 illustrates an embodiment of distributing a paging table's 961 records to 32 BRAM modules according to the present invention.

DESCRIPTION OF THE EXEMPLARY EMBODIMENT

The prototype of this invented system is successfully built into a PCI card which mainly contains a Xilinx's Kintex7 FPGA chip and two DDR3 memory modules. FPGA chip includes: 32 32-bit processing units (PUs), one PCIE controller, one search/delete/insert controller and two DDR3 controllers.

Figure 1:
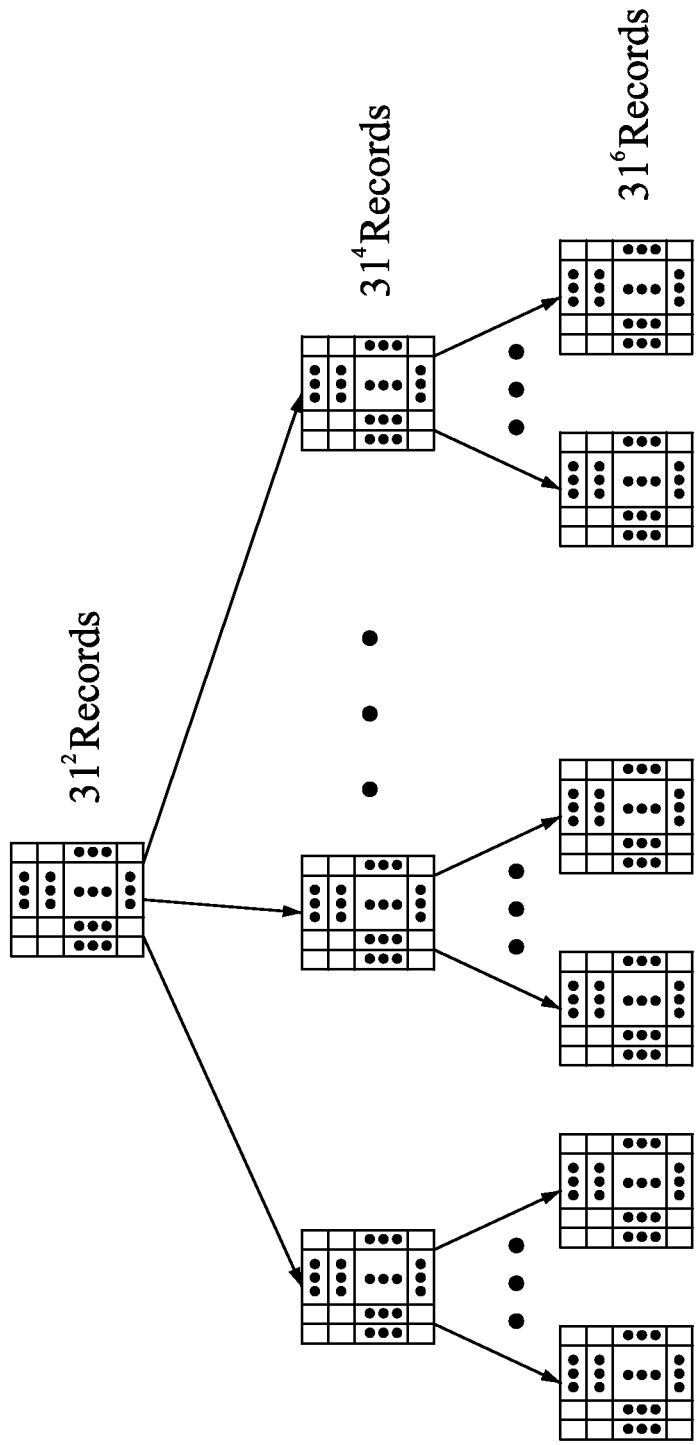
FIG. 1 illustrates an embodiment of the hierarchical paging table for large data volume according to the present invention.
Figure 2:
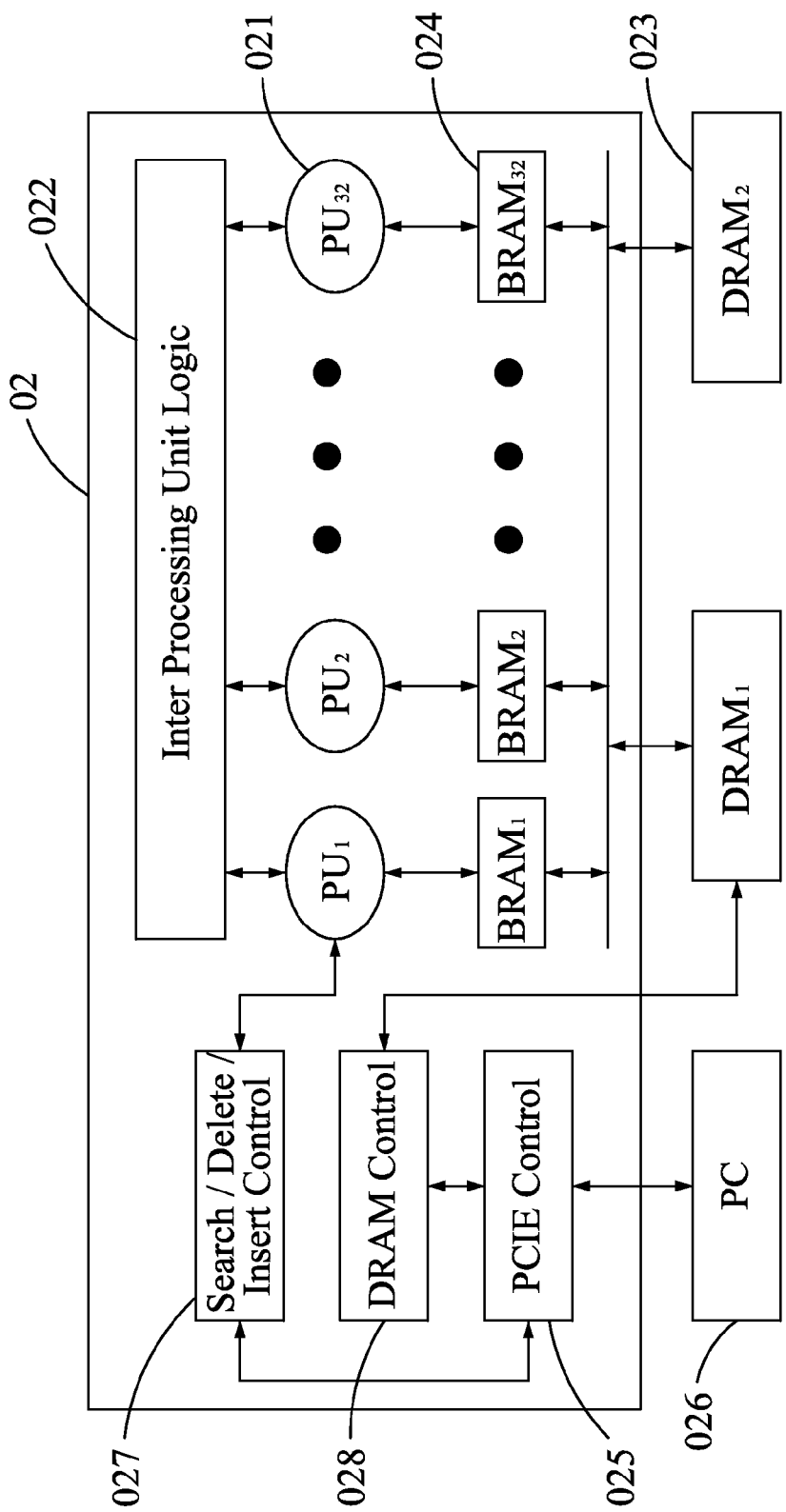
FIG. 2 illustrates an embodiment of the overall architecture of a parallel hardware searching system according to the present invention.

Hierarchical paging table shown in FIG. 1 is used to process data with large volume. A large number of ordered records are partitioned into many paging tables. These tables are constructed into hierarchical structure with 3 levels. Since total PU number is m=32 and one PU must enter into rest state, the maximum record number of each paging table is 961(=31*31) in our method. Hence, no more than two comparisons are required for searching a page. Each record contains a search value field and an object pointer field. Search value size can reach to a hundred and twenty eight bytes in the design. FIG. 2 shows the overall architecture of a parallel hardware searching system. This system includes a parallel hardware search module 02 and DRAM units 023. The 32 PUs of search module are connected to Inter Processing Unit Logic (IPUL) 022. IPUL processes the functions between PUs. The partitioned pages are stored into DRAM units. DRAM can be replaced with universal memory such as FRAM, MRAM, RRAM or other memory in the near future. A paging table can be retrieved from DRAM and distributed into 32 BRAM units 024 for implementing specific operation by using DRAM controller 028. It is noted that BRAM is a dual port RAM in Kintex7 FPGA. The page table in BRAM units can also be stored into DRAM. Paging table's transfer time can be increased by increasing DRAM unit number.

Using PCIE (USB or SATA) controller 025, PC 026 can transfer a paging table from hard disk to BRAM units 024. can also collect and modify paging table in BRAM units. PC passes command to search/insert/delete controller 027 or DRAM controller 028 to execute five operations: search, insert, delete, transfer paging table from DRAM to BRAM, or from BRAM to DRAM.

FIG. 3 is the paging table whose 961 records are distributed into 32 BRAM units. Each record is represented with record's location, and location is the rank of records that are sorted according to their search values. The data in each column is stored in each PU's own BRAM unit. The index of PU is defined as Pindex. The Pindex values of 32 PUs are assigned from 1 to 32, and $PU_{32}$ is treated as $PU_0$. The Pindex value can be derived from location in our design using equation: Pindex=LOCATION MOD m. Initial search range is from location 1 to location 961. Hence, the location in lower bound is defined as LowerBound=1, and the location in Upper bound is defined as UpperBound=961. DLB is defined as LowerBound−1. The index of rest PU is defined as RPindex. The search range is partitioned into m−1 data blocks in each level. The data block size is defined as BlockSize: BlockSize=

$(m-1)^{LEVEL-1}$ where LEVEL is level number. BlockSize=31 at LEVEL=2, BlockSize=1 at LEVEL=1. The BlockSize values are previously stored in the system. Search range is reduced to 1/m in each level. Finally, search will be completed after LEVEL=1. Although the UpperBound value can also be used to derive four equations. However, it seems easier for hardware design to derived equations from DLB.

Figure 4:
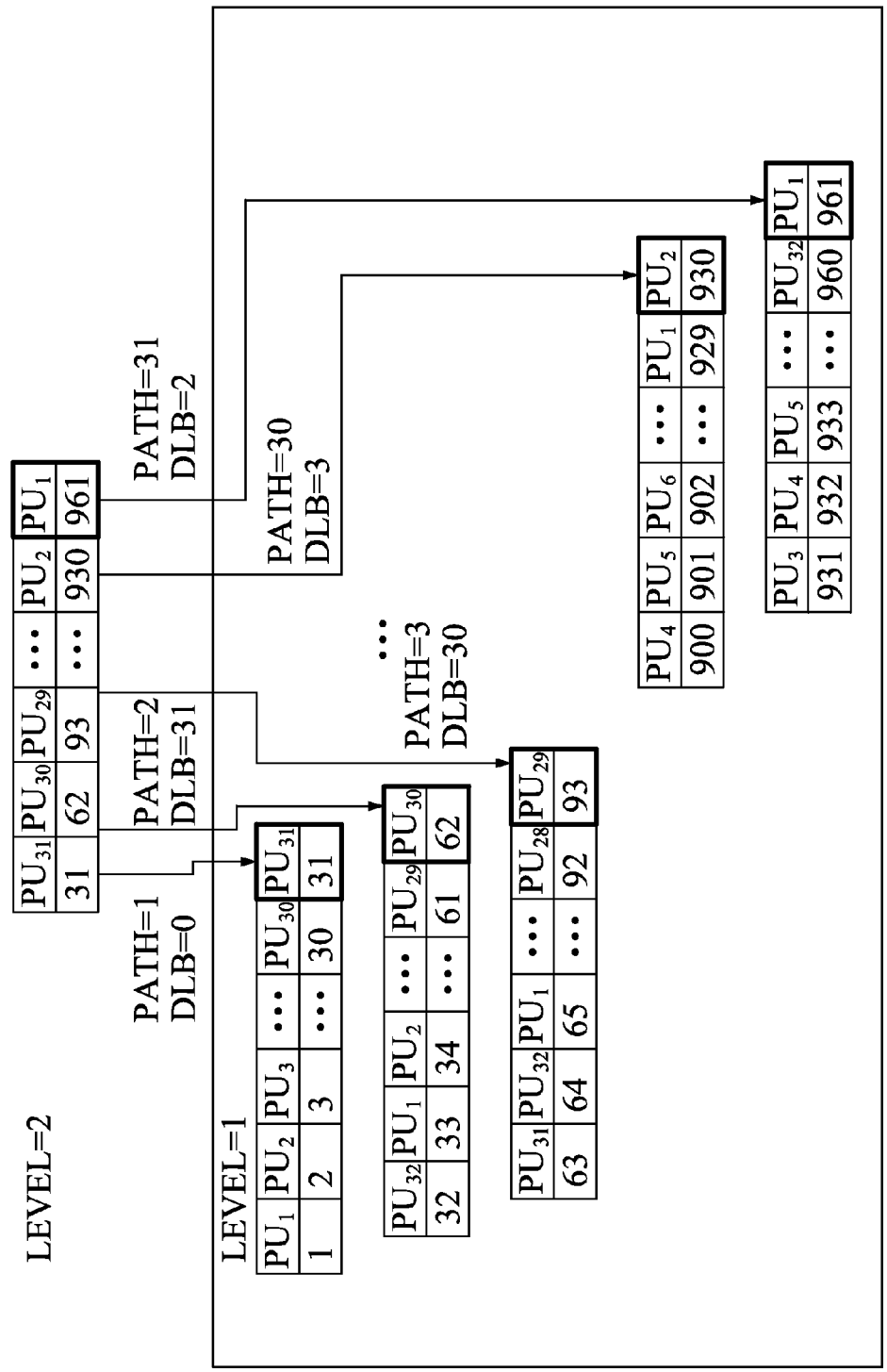
FIG. 4 illustrates an embodiment of the virtual B-tree structure based on the embodiment of FIG. 3 according to the present invention.

FIG. 4 shows that search is begin at top level of virtual B-tree. LEVEL=2 and BlockSize=31 at this level. Initial value of DLB is 0. It is known that $PU_{32}$ will enter into rest state using RPindex equation. After PATH and LOCATION equations are calculated, the PATH values of $PU_{31}$~$PU_1$ are 1~31, and the LOCATION values of $PU_{31}$~$PU_1$ are 31, 62, . . . , 961. LOCATION values are transferred into PAddress values using PAddress equation. All the search values in $PU_{31}$~$PU_1$ are compared with criterion. Inter Processing Unit Logic finds that criterion is between $PU_{26}$ with LOCATION=186 and $PU_{25}$ with LOCATION=217. DLB is assigned with the lower location value 186, and $PU_{26}$ will enter rest state in next loop. Then, new loop is started from the bottom level of virtual B-tree. LEVEL=1 and BlockSize=1 at this level. Search range is reduced to LOCATION 187~217. All PUs except $PU_{26}$ will work together, and correct record will be found. Object pointer of correct record is stored into register DO4.

Figure 5:
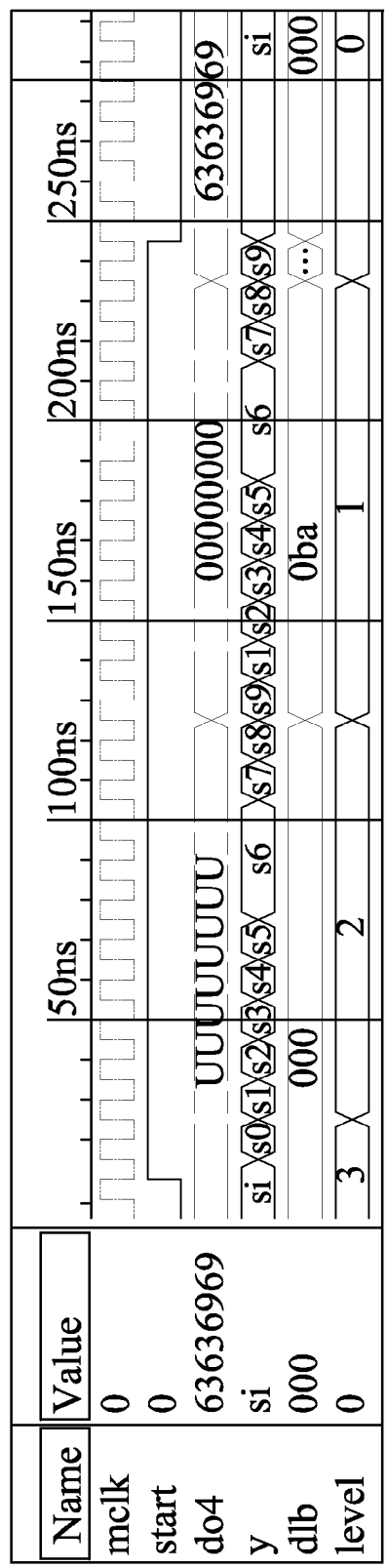
FIG. 5 illustrates an embodiment of the timing diagram of search operation according to the present invention.

FIG. 5 is timing diagram of search operation. Search is started at start='1', and completed at start='0'. Search is processed according to virtual B-tree which can be derived by computing four unsigned number equations. If PU number is $2^k$ where k is an integer, then division can be implemented by using shift left operation. Therefore, each equation can be processed within one clock cycle. Search steps in FIG. 5 is describing on detail below:

At state=s0, RPindex can be found from RPindex=DLB MOD m. Since initial DLB values are assigned as 0, Hence level=2, BlockSize=31.

At state=s1, PATH equation in each PU is calculated as: PATH=RPindex−Pindex if level is odd, or PATH=Pindex−PPindex if level is even.

At state=s2, each PU calculates largest location value in its data block. This location is calculated as: LOCATION=DLB+PATH*BlockSize.

At state=s3, physical address (PAddress) for retrieving search data is calculated from location as: PAddress=LOCATION*RecordSize/m.

At state=s4, PAddress are loaded into address register in each PU.

At state=s5, one clock latency is required for read data in BRAM.

At state=s6, Three 32-bit data segments are compared with criteria in each PU.

At state=s7, 32-bit object pointer is retrieved and then stored into register DO4 if criteria is found. Otherwise, store 0 to register.

At state=s8, Inter Processing Unit Logic will detects that criteria is between location 186 in $PU_{26}$ and location 217 in $PU_{25}$. Therefore, Lower location value 186 is chose as DLB value.

At state=s9, broadcast DLB to all PUs. $PU_{26}$ is rest PU at level=1. Continue to process Step 1 to Step 8 in next loop. Correct record will be found and its object pointer "63636969" is stored in DO4.

Assume record number of a page be N. To process delete, search is used to find the deleting record's location I. Then, records from I+1 to N are shifted left once. If a distinct record needs to be insert into location I, all records from N to I are shifted right once. Then, PC inserts this record into location I. These operations can be processed on parallel using 32 PUs. In our method, each record of the page has distinct search value. A search value may correspond to several objects in some cases. In these cases, our object pointer points to an array containing several pointers. Then, data objects can be collected one by one using array.

Total 6 comparisons are required to search 0.8875× $10^9$ (=$31^6$) records using our method. Our present computer can only use 6 comparisons to search 63(=$2^6$−1) records using binary search. If our method is combined with HASH which has $31^4$ buckets, then 1 comparison is required for searching 0.8875×$10^9$ records in best case and 6 comparisons is required in worst case. The average comparison number is 2. Since pure hardware search is used, our method can process each comparison much faster and reliable than present computer.

In FIG. 3, PU number=32, and this table is used to construct the nodes in level 1 of virtual B-tree of FIG. 4. It is obvious to see that every PU processes data in its own BRAM unit in the nodes of level 1. Four edge records in level 1 are used to construct a node in level 2. It is also obvious that every PU processes data in its own BRAM unit in entire B-tree nodes; Assume that total PU number can be any number, and virtual B-tree has multiple levels. Table similar to the table in FIG. 3 can be used to prove that every PU processes data in its own BRAM unit in level=1 of virtual B-tree similar to B-tree in FIG. 4. If every PU processes data in its own BRAM unit is true in level i, we can easily prove that every PU processes data in its own BRAM unit is also true in level i+1. Because all node in level i+1 are constructed form the edge records of the nodes in level i. Therefore, it can be mathematically proved that our method can process search on parallel at any PU number.

What is claimed is:

1. A parallel hardware searching system used to build an artificial intelligent computer, wherein the system mainly contains a hardware search module and several DRAM (or universal memory) modules, said hardware search module comprises:

m processing units (PUs) which are connected with m BRAM units and one Inter Processing Unit Logic, PU only process the data in its own BRAM unit, PUs are also connected to Inter Processing Unit Logic (IPUL) which processes the functions between PUs;

an PCIE interface controller which is used to connect search module to external PC, search module use PCIE to receive data or command from PC, or transmit data to PC; and a search/insert/delete controller which is used to connect PUs and their BRAM units, after receiving search, insert or delete command from PC, controller directs PUs to execute the command over the data in BRAM units;

wherein the system uses four unsigned number equations to simulate B-tree process, and these equations are derived from DLB; the DLB is lower bound of present search range minus 1; PU number is chosen as $2^k$ where k is an integer, each equation can be processed within one clock cycle; said four equations can be expressed as;

1: Find the index number of rest processing unit using RPindex equation, RPindex equation is:

RPindex=DLB MOD $m$;

2: Pindex is the fixed index assigned to PUs from 1 to m; the PATH value is calculated using PATH equation, PATH equation is:

PATH=RPindex−Pindex, when level is odd,

PATH=Pindex−PPindex, when level is even;

3: Present search range are partitioned into m−1 equivalent data blocks, Blocksize is the size of this block, the largest location in each data block is calculated using LOCATION equation, LOCATION equation is:

LOCATION=DLB+PATH*BlockSize;

4: RecordSize is the size of record in paging table, in order to find physical address of search value which is represented by its location, processing unit calculates PAddress equation below:

PAddress=LOCATION*RecordSize/m.

2. The parallel hardware searching system of claim 1, wherein the system is connected with PC through an interface; such a system is used to upgrade computer language grammar from context-free to Turing machine.

3. The parallel hardware searching system of claim 1, wherein the system uses hierarchical paging table to process large data volume; large amount of data are partitioned into a number of paging tables; smaller data amount of paging table reduce cache size, data transfer and processing time; data transfer rate is increased by increasing DRAM (or universal memory) unit number.

4. The parallel hardware searching system of claim 1, wherein the system contains a hardware module; PC can give the command to controller in hardware module to process 5 different operations: search, delete, insert, transfers paging table from BRAM to DRAM (or universal memory) or from DRAM (or universal memory) to BRAM; regardless of any PU number, this system is a real parallel searching system.

5. The parallel hardware searching system of claim 1, wherein the system implements delete or insert with the help of search, and large number of PUs process shift left or right among relative small amount of data in the paging table; the data structure in all paging tables are always sorted and well structured, when delete or insert is performed.

6. The parallel hardware searching system of claim 1, wherein the system can adopt hash technique; a large hierarchical paging table is partitioned into a number of smaller hierarchical paging tables; the performance is further improved; high parallelism and hierarchical paging tables of the system help hash to overcome fluctuation problem.

7. The parallel hardware searching system of claim 1, wherein the system only processes the record with distinct search value in its page; but, a search value may correspond to several objects; in this case, object pointer points to an array object containing several pointers, and data objects can be collected one by one through array.

8. The parallel hardware searching system of claim 1, can complete searching paging table within $L=\lceil \log_{m-1} N \rceil$ loops in worst case, where PU number is m, and N the number of records for this paging table; the initial value of DLB is set to 0, Search is started from the top level (LEVEL=L) to the lowest level (LEVEL=1) of virtual B-tree; the previous search range is continually reduced to 1/(m−1) in each level until result is found, each loop execution comprise the following steps:

step 1: using the RPindex equation to calculate the index of rest state PU in this level of virtual B-tree;

step 2: using PATH equation to calculate each PU's representing path value in this level of virtual B-tree, the path value of a resting state PU is 0; the representing path values of remaining m−1 working state PU are from 1 to m−1;

step 3: searching range in this level of virtual B-tree are partitioned into m−1 data blocks by m−1 working state PUs, each working state PU use LOCATION equation to find its data block's largest location;

step 4: the working state PUs using PAddress equation to convert location of last step into physical address;

step 5: the working state PUs retrieving the search values and comparing with criteria; search is finished if criteria is found, otherwise go to next step; and step 6: the IPUL finding the criteria between two PUs and their locations in this loop, smaller LOCATION value is assigned to new DLB in next loop, and broadcast this value to all PUs, then restart search steps for next loop.

\* \* \* \* \*